(12) United States Patent
Kesch

(10) Patent No.: US 9,579,981 B2
(45) Date of Patent: Feb. 28, 2017

(54) METHOD AND DEVICE FOR DETERMINING AN OPERATING STRATEGY FOR A RANGE EXTENDER OF AN ELECTRIC VEHICLE

(71) Applicant: Robert Bosch GmbH, Stuttgart (DE)

(72) Inventor: Bernd Kesch, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/442,828

(22) PCT Filed: Oct. 21, 2013

(86) PCT No.: PCT/EP2013/071940
§ 371 (c)(1),
(2) Date: May 14, 2015

(87) PCT Pub. No.: WO2014/082790
PCT Pub. Date: Jun. 5, 2014

(65) Prior Publication Data
US 2015/0298554 A1 Oct. 22, 2015

(30) Foreign Application Priority Data

Nov. 28, 2012 (DE) .................. 10 2012 221 731

(51) Int. Cl.
*B60L 11/12* (2006.01)
*B60L 15/20* (2006.01)
(Continued)

(52) U.S. Cl.
CPC .............. *B60L 11/123* (2013.01); *B60K 6/46* (2013.01); *B60L 11/126* (2013.01);
(Continued)

(58) Field of Classification Search
CPC ...... B60L 11/123; B60L 11/126; B60L 15/20; B60L 15/2045; B60K 6/46; B60W 10/06; B60W 10/08; B60W 20/10; B60W 20/40
(Continued)

(56) References Cited

U.S. PATENT DOCUMENTS 7,847,499 B2 * 12/2010 Nakamura ............... B60L 3/003
318/400.27
8,207,838 B2 * 6/2012 Watanabe ............. B60L 11/123
340/439
(Continued)

FOREIGN PATENT DOCUMENTS

CN           1953886 A    4/2007
CN         201012633 Y    1/2008
(Continued)

OTHER PUBLICATIONS

International Search Report for Application No. PCT/EP2013/071940 dated Aug. 6, 2014 (English Translation, 3 pages).

*Primary Examiner* — John Walters
(74) *Attorney, Agent, or Firm* — Michael Best & Friedrich LLP

(57) ABSTRACT

The present invention relates to a method for determining an operating strategy for a range extender (10) of an electric vehicle (100) having an electric motor (20) and an electrical energy store (30), with the following method steps: detecting (S1) at least one operating parameter of a first type associated with the range extender (10) and at least one operating parameter of a second type associated with the electric motor (20) and/or the electrical energy store (30); and determining (S2) the operating strategy for the range extender (10) by restricting a usage level of the range extender (10), wherein the restriction of the usage level is determined on the basis of the at least one detected operating (Continued)

parameter of the first type and/or the at least one detected operating parameter of the second type.

7 Claims, 1 Drawing Sheet

(51) Int. Cl.
| | | |
|---|---|---|
| *B60K 6/46* | (2007.10) | |
| *B60W 10/06* | (2006.01) | |
| *B60W 10/08* | (2006.01) | |
| *B60W 20/00* | (2016.01) | |
| *B60W 50/00* | (2006.01) | |
| *B60W 50/14* | (2012.01) | |

(52) U.S. Cl.
CPC ......... *B60L 15/2045* (2013.01); *B60W 10/06* (2013.01); *B60W 10/08* (2013.01); *B60W 20/10* (2013.01); *B60W 20/40* (2013.01); *B60L 2250/16* (2013.01); *B60L 2260/52* (2013.01); *B60L 2260/54* (2013.01); *B60W 2050/005* (2013.01); *B60W 2050/0089* (2013.01); *B60W 2050/146* (2013.01); *B60W 2510/244* (2013.01); *B60W 2710/086* (2013.01); *Y02T 10/6217* (2013.01); *Y02T 10/6286* (2013.01); *Y02T 10/645* (2013.01); *Y02T 10/7077* (2013.01); *Y02T 10/72* (2013.01); *Y02T 10/7283* (2013.01)

(58) Field of Classification Search
USPC .................................. 180/65.245, 65.29, 2.1
See application file for complete search history.

(56) References Cited

U.S. PATENT DOCUMENTS

| | | | |
|---|---|---|---|
| 8,359,133 B2* | 1/2013 | Yu | ........................... B60K 6/445 |
| | | | 701/22 |
| 9,037,325 B2* | 5/2015 | Lu | ....................... B60L 15/2045 |
| | | | 180/65.28 |
| 2004/0145338 A1 | 7/2004 | Nakamura et al. | |
| 2005/0068007 A1 | 3/2005 | Prema et al. | |
| 2010/0097202 A1 | 4/2010 | Watanabe et al. | |
| 2011/0172867 A1 | 7/2011 | Yu et al. | |
| 2012/0053772 A1 | 3/2012 | Lu | |

FOREIGN PATENT DOCUMENTS

| | | |
|---|---|---|
| CN | 101973268 A | 2/2011 |
| DE | 102010002168 | 8/2011 |
| DE | 102011118116 | 5/2012 |
| EP | 2055548 | 5/2009 |
| EP | 2308708 | 4/2011 |
| WO | 2012069199 | 5/2012 |

\* cited by examiner

METHOD AND DEVICE FOR DETERMINING AN OPERATING STRATEGY FOR A RANGE EXTENDER OF AN ELECTRIC VEHICLE

BACKGROUND OF THE INVENTION

The present invention relates to a method and a device for determining an operating strategy for a range extender of an electric vehicle.

A vehicle having a range extender is based on a vehicle having an electric drive and an electrical energy store. A further power unit is provided which is decoupled therefrom and provides electrical drive energy for the drive system of the vehicle by means of a chemical reaction of a substance and, as the case may be, by means of an energy conversion performed in the rest of the power unit, such as an energy conversion ensuing from a mechanical energy form into an electrical energy form.

The WO 2012 069 199 A2 patent specification of the World Intellectual Property Organization describes a current generator set which is designed as a range extender for an electrically driven motor vehicle.

An internal combustion engine, preferably a rotary piston engine and, in particular a rotary-cylinder engine, and a generator are disposed in a housing to form the aforementioned current generator set.

The German patent specification DE 10 2011 118 116 A1 describes an electric vehicle having at least one electric drive motor and an electrical energy store. The cruising range extension device of the electric vehicle described there is designed to generate electrical energy from a fuel. A control device is provided to control the cruising range extension device in the case of said described electric vehicle.

The electric vehicle described in the German patent specification DE 10 2011 118 116 A1 and the cruising range extension device each have mutually complementary coupling devices for temporarily fastening the range extension device to the electric vehicle. The coupling devices allow for a coupling in a controlled and power transmitting manner. The control device is equipped to control two different operating modes, namely an electric driving mode and a hybrid driving mode.

The German patent specification DE 10 2010 002 168 A1 describes a range extender for a vehicle driven by a first electrical machine, comprising an energy store for supplying energy to the first electrical machine, a second electrical machine operated as a generator for producing electrical energy for charging the energy store, an internal combustion engine for driving the generator and an uncontrolled rectifier for rectifying an output voltage of the generator. In the case of the vehicle described here, the second electrical machine and the rectifier each have a 9-phase configuration.

The European patent specification EP 230 870 8 A1 describes a serial hybrid electric vehicle which is connected to an internal combustion engine in order to achieve a cruising range extension.

The serial hybrid electric vehicle described here relates to a generator having a discrete mounting of the rotor shaft in a generator housing, wherein the disc generator is formed directly without being mounted on the motor housing or, respectively, on the crankshaft. The internal combustion engine in the hybrid electric vehicle described here is coupled by means of self-centering spur gear teeth to the generator of the range extender system.

SUMMARY OF THE INVENTION

The present invention relates to a method for determining an operating strategy for a range extender of an electric vehicle and to a device for determining an operating strategy for a range extender of an electric vehicle.

A method is accordingly provided for determining an operating strategy for a range extender of an electric vehicle comprising an electric motor and an electrical energy store, with the following method steps: detecting at least one operating parameter of a first type associated with the range extender and at least one operating parameter of a second type associated with the electric motor and/or the electrical energy store; and determining the operating strategy for the range extender by restricting a usage level of the range extender, wherein the restriction of the usage level is determined on the basis of the at least one detected operating parameter of the first type and/or the at least one detected operating parameter of the second type.

According to a further aspect of the present invention, a device for determining an operating strategy for a range extender of an electric vehicle comprising an electric motor and an electrical energy store is provided.

The device for determining an operating strategy comprises a detection means which is designed to detect at least one operating parameter of a first type associated with the range extender and at least one operating parameter of a second type associated with the electric motor and/or the electrical energy store.

The device for determining an operating strategy further comprises a controller which is designed to determine an operating strategy for the range extender by restricting a usage level of the range extender on the basis of the at least one detected operating parameter of the first type and/or the at least one detected operating parameter of the second type.

The gist of the invention lies in the fact that the aging of and wear to the range extender is reduced. This also means that the probability of a possible defect or malfunction of the range extender occurring as a result of said aging or wear is reduced.

In addition, the design objectives and the performance data for the entire electrical drive train or the electrical drive system of the electric vehicle can be advantageously achieved by means of the improved operating strategy of the range extender of the electric vehicle.

On the basis of different premises and predetermined criteria, such as a predetermined usage of the electric vehicle, the range extender of the electric vehicle can therefore be advantageously designed such that the operating time of the range extender contingent on the respective operating strategy meets the requirements for the operating time of the electrical drive system of the electric vehicle which have been specified by the driver.

The range extender of the electric vehicle can likewise be designed such that the amount of the maximum possible energy supply carried out by the range extender also meets the requirements for the operating time of the electrical drive system of the electric vehicle.

According to one embodiment of the invention, provision is made for the restriction of the usage level of the range extender to include a limiting of a maximum power output of the range extender. In so doing, a useful life of the range extender can advantageously be achieved.

According to one embodiment of the invention, provision is made for a histogram of a load distribution of the range extender to be used as the at least one operating parameter of a first type. This advantageously allows for an operating strategy for the range extender to be optimally adapted to the load distribution of said range extender.

According to one embodiment of the invention, provision is made for a histogram of a duty cycle of the electric motor to be used as the at least one operating parameter of a second type. In so doing, an operating strategy for the range extender can be optimally adapted to the usage behavior of the driver.

According to one embodiment of the invention, provision is made for a charging state of the electrical energy store to be used as the at least one operating parameter of a second type.

According to one embodiment of the invention, provision is made for the determined operating strategy to be displayed via a human-machine-interface. As a result, the operating strategy can be displayed to the driver in a simple and reliable manner.

According to one embodiment of the invention, provision is made for at least one control parameter to be transmitted via a human-machine-interface and for the restriction of the usage level to be determined on the basis of the at least one control parameter.

According to one embodiment of the invention, provision is made for the device to further have a human-machine-interface which is designed to display the determined operating strategy. As a result, the driver of the electric vehicle can be advantageously informed about the operating state of the device and the operating strategy currently being used.

According to one embodiment of the invention, provision is made for the human-machine-interface to be designed to transmit a control parameter to the controller. In so doing, the operating strategy can be advantageously adapted to the inputs of the driver and, as a result, the driver's request can be taken into account when determining the operating strategy.

The embodiments of and modifications to the invention described above can be arbitrarily combined with one another.

Further possible embodiments, modifications and implementations of the invention also do not comprise explicitly named combinations of features of the invention which were previously described or are described below with respect to exemplary embodiments.

BRIEF DESCRIPTION OF THE DRAWINGS

The attached drawings are meant to provide a further understanding of the embodiments of the invention.

Said drawings illustrate embodiments and are used in combination with the description to explain the principles and concepts of the invention.

Figure 1:
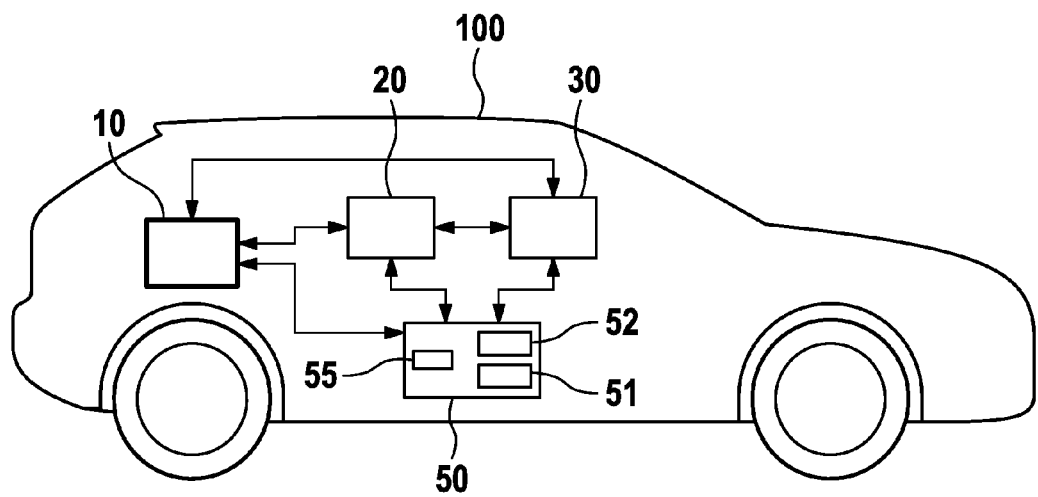

Other embodiments and many of the aforementioned advantages ensue from the drawings. The elements depicted in the drawings are not necessarily drawn to scale in relation to one another.

Figure 2:
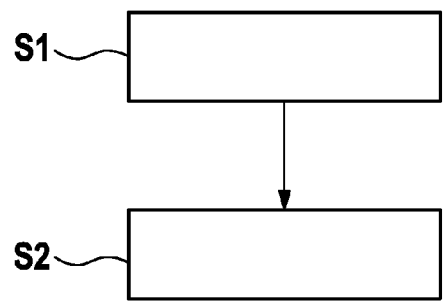

In the drawings:

FIG. 1 shows a schematic depiction of a device for determining an operating strategy for a range extender of an electric vehicle having an electric motor and an electrical energy store according to one embodiment of the invention; and FIG. 2 shows a schematic depiction of a flow diagram of a method for determining an operating strategy for a range extender of an electric vehicle having an electric motor and an electrical energy store according to a further embodiment of the invention.

DETAILED DESCRIPTION

In the figures of the drawings, identical reference signs denote identical or functionally identical elements, components or method steps, in so far as nothing is stated to the contrary.

FIG. 1 shows a schematic depiction of a device for determining an operating strategy for a range extender of an electric vehicle having an electric motor and an electrical energy store.

The electric vehicle 100 can be designed as a motor vehicle having an electric motor or as a hybrid motor vehicle or as another type of motor vehicle which has an electric motor 20, an electrical energy store 30 and a range extender 10.

The electric vehicle 100 can also be designed as a plug-in hybrid electric vehicle or as a plug-in electric vehicle; thus enabling the electrical energy store 30 to be charged from outside of the electric vehicle 100 by a stationary charging station or by means of another type of connection to an electrical energy supply network.

The range extender 10 can be designed as a range extender which constitutes an additional power unit in the electric vehicle 100 which increases the range of said electric vehicle 100.

The range extender 10 can be designed as an internal combustion engine which drives a generator that in turn supplies electrical energy to the electrical energy store 30 and/or to the electric motor 10 of the electric vehicle 100.

The range extender 10 can furthermore be designed as a power unit comprising a fuel cell.

The fuel cell is designed, for example, as a galvanic cell which converts the chemical reaction energy of a continually supplied fuel or of another type of operating means and an oxidation means into electrical energy.

For example, a fuel cell can be used in the range extender 10 in the form of a hydrogen-oxygen fuel cell.

The energy for power production by the range extender 10 is supplied in a chemically bound form with the fuels or other types of operating means.

The electric motor 20 can be designed as an electric motor which is coupled via a planetary gear set to one of the drive axles of the electric vehicle 100; or the electric motor 20 can, for example, be designed as a wheel hub electric motor.

The electrical energy store 30 of the electric vehicle 100 is, for example, designed as a lithium based battery or as a nickel-cadmium battery or as a nickel-metal hydride battery or as another type of battery.

A device 50 for determining an operating strategy for a range extender 10 of an electric vehicle 100 having an electric motor 20 and an electrical energy store 30 comprises a detection means 51 and a controller 52.

The detection means 51 can be designed to detect at least one operating parameter of a first type associated with the range extender 10 and at least one operating parameter of a second type associated with the electric motor 20 and/or the electrical energy store 30.

The detection means 51 can, for example, be designed as a sensor for detecting the operating parameters or as an interface to a vehicle-internal bus system for receiving the operating parameters.

The controller 52 is, for example, designed to determine an operating strategy for the range extender 10 by restricting a usage level of the range extender 10 on the basis of the at least one detected operating parameter of a first type and/or the at least one detected operating parameter of a second type.

The device 50 for determining an operating strategy can furthermore have a human-machine-interface 55 which is designed to display the determined operating strategy.

The human-machine-interface 55 is, for example, designed to transmit at least one control parameter to the controller 52.

The human-machine-interface 55 allows the user to operate the device 50 for determining an operating strategy and to display an operating state of the device 50 and/or of the range extender 10.

The items of information or the feedback from the human-machine-interface 55 are provided either via control panels with signal lamps, display fields and push buttons or via another type of visualization program, which, for example, is shown on a display or a display device of the human-machine-interface 55.

The controller 52 and/or the detection unit 51 can be coupled via a vehicle-internal bus system of the electric vehicle 100, for example a CAN bus system. The human-machine-interface 55 can likewise be coupled to the controller 52 via such a vehicle-internal bus system of the electric vehicle 100.

The controller 52 of the device 50 can be designed as a program-controlled device and/or as a microcontroller and/or as a configurable logic module and/or as an integrated circuit and/or as an application specific integrated circuit and/or as a computer and/or as an embedded system.

The controller 52 and/or the detection means 51 are, for example, designed as technical components that are connected by means of a network.

FIG. 2 shows a schematic depiction of a flow diagram of a method for determining an operating strategy for a range extender of an electric vehicle having an electric motor and an electrical energy store according to a further embodiment of the invention.

As a first method step of the method for determining an operating strategy, a detection S1 of at least one operating parameter of a first type associated with the range detector 10 and of at least one operating parameter of a second type associated with the electric motor 20 and/or the electrical energy store 30 takes place.

As a second method step of the method for determining an operating strategy, a determination S2 of the operating strategy for the range extender 10 takes place by restricting a usage level of the range extender 10, wherein the restriction of the usage level is determined on the basis of the at least one detected operating parameter of the first type and/or the at least one detected operating parameter of the second type.

The restriction of the usage level of the range extender 10 can include a limiting of a maximum power output of the range extender 10.

A histogram of a load distribution of the range extender 10 can be used as the at least one operating parameter of a first type. In addition, a histogram of a duty cycle of the electric motor 20 can be used as the at least one operating parameter of a second type.

At least one control parameter can furthermore be transmitted via a human-machine-interface 55, and the restriction of the usage level can be determined on the basis of the at least one control parameter.

An operating mode of the range extender 10 that is optimized to the wear of said range extender can be provided as the at least one control parameter. The method steps can thereby be, iteratively or recursively, repeated in an arbitrary sequence.

The method for determining an operating strategy can be carried out by the device 50.

Although the present invention has been described above with the aid of preferred exemplary embodiments, said invention is not limited to these exemplary embodiments but can be modified in a plurality of ways. In particular, the invention can be changed or modified in a variety of ways without deviating from the gist of the invention.

The invention claimed is:

1. A method for determining an operating strategy for a range extender (10) of an electric vehicle (100) having an electric motor (20) and an electrical energy store (30), with the following method steps:
   detecting (S1) at least one operating parameter of a first type associated with the range extender (10) and at least one operating parameter of a second type associated with the electric motor (20) or the electrical energy store (30); and
   determining (S2) the operating strategy for the range extender (10) by restricting a usage level of the range extender (10), wherein the restriction of the usage level is determined on the basis of the at least one detected operating parameter of the first type or the at least one detected operating parameter of the second type;
   wherein the determined operating strategy is displayed via a human-machine-interface (55) and at least one control parameter is transmitted via the human-machine-interface (55), and wherein the restriction of the usage level of the range extender (10) is determined on the basis of the at least one control parameter.

2. The method according to claim 1, characterized in that the restriction of the usage level of the range extender (10) includes a limiting of a maximum power output of the range extender (10).

3. The method according to claim 1, characterized in that a histogram of a load distribution of the range extender (10) is used as the at least one operating parameter of the first type.

4. The method according to claim 1, characterized in that a histogram of a duty cycle of the electric motor (20) is used as the at least one operating parameter of the second type.

5. The method according to claim 1, characterized in that a charging state of the electrical energy store (30) is used as the at least one operating parameter of the second type.

6. A device (50) for determining an operating strategy for a range extender (10) of an electric vehicle (100) having an electric motor (20) and an electrical energy store (30), comprising:
   a detector (51) which is designed to detect at least one operating parameter of a first type associated with the range extender (10) and at least one operating parameter of a second type associated with the electric motor (20) or the electrical energy store (30);
   a controller (52) which is designed to determine an operating strategy for the range extender (10) by restricting a usage level of the range extender (10) on the basis of the at least one detected operating parameter of the first type or the at least one detected operating parameter of the second type; and
   a human-machine-interface (55) configured to display the determined operating strategy and to transmit at least one control parameter to the controller (52).

7. The device (50) according to claim 6, characterized in that the restriction of the usage level of the range extender (10) includes a limiting of a maximum power output of the range extender (10).

* * * * *